United States Patent [19]

Lindell et al.

[11] Patent Number: 4,680,885
[45] Date of Patent: Jul. 21, 1987

[54] FISH JIGGING DEVICE

[76] Inventors: Allan D. Lindell, R.R. 1, Armstrong, Iowa 50514; Ronald L. Roalson, 29 W. Kenrue La., Fairmont, Minn. 56301

[21] Appl. No.: 920,139

[22] Filed: Oct. 17, 1986

[51] Int. Cl.⁴ ............................................. A01K 97/10
[52] U.S. Cl. ...................................... 43/19.2; 43/26.1
[58] Field of Search ......................... 43/17, 19.2, 26.1

[56] References Cited

U.S. PATENT DOCUMENTS

| | | | |
|---|---|---|---|
| 2,707,843 | 5/1955 | Howe | 43/26.1 |
| 3,568,352 | 3/1971 | Hill | 43/26.1 |
| 3,691,668 | 9/1972 | Strebig | 43/19.2 |
| 4,384,427 | 5/1983 | Christiansen | 43/26.1 |
| 4,597,215 | 7/1986 | Otremba | 43/19.2 |

*Primary Examiner*—M. Jordan
*Attorney, Agent, or Firm*—Herman H. Bains

[57] ABSTRACT

A jigging machine for use in jigging a fishing line includes a unipolar stepper motor having an output shaft revolvable through a step angle of approximately 7.5 degrees per step. A reel having a fishing line wound thereon is secured to the shaft of a stepper motor and is provided with a bait or lure at the free end thereof. The stepper motor is operated by electrical circuitry through a predetermined number of rapid steps in one direction, and the stepper motor is then automatically reversed to revolve the output shaft thereof in the opposite direction. This mode of operation produces a rapid jigging action to the fishing line and to the bait or lure secured thereto.

9 Claims, 4 Drawing Figures

FISH JIGGING DEVICE

This invention relates to a fishing device and, more particularly, to a device for automatically jigging a fishing line.

BACKGROUND OF THE INVENTION

There are many styles of fishing which depend, in large part, upon the kind of fish the fisherman is attempting to catch. One style of fishing involves imparting a rapid up and down or jigging motion to the lure or bait. Typically, jigging is done manually by a fisherman and may be done with a short jigging rod. However, it is difficult to continuously produce an action by manual jigging which simulates the natural movement of a minnow or other type of bait or lure. Presently, there are no machines or devices for performing a continuous jigging action.

U.S. Pat. No. 4,376,350 discloses a device for lowering a trolling line to a predetermined depth or point and for automatically raising the trolling line to a predetermined surface point. However, this device is incapable of performing a rapid jigging action.

SUMMARY OF THE INVENTION

It is an object of this invention to provide an electronic jigging device which may be preset to impart a rapid, constant jigging action to a fishing line and the bait carried thereby so that the bait or lure simulates the natural movement of the minnow or other kinds of live bait.

Another object of this invention is to provide an electronic jigging device which may be preset to produce a constant jigging action at a predetermined depth or may be preset to produce a constant jigging action between a preselected upper level and a preselected lower level.

A more specific object of this invention is to provide an electronic jigging device, including a stepper motor having a fishing line reel on the output shaft thereof and circuit means for reversing the direction of rotation of the stepper motor after the output shaft has been rotated through a predetermined number of steps.

These and other objects of the invention will be more fully defined in the following Specification.

FIGURES OF THE DRAWING

DESCRIPTION OF THE PREFERRED EMBODIMENT

Figure 1:
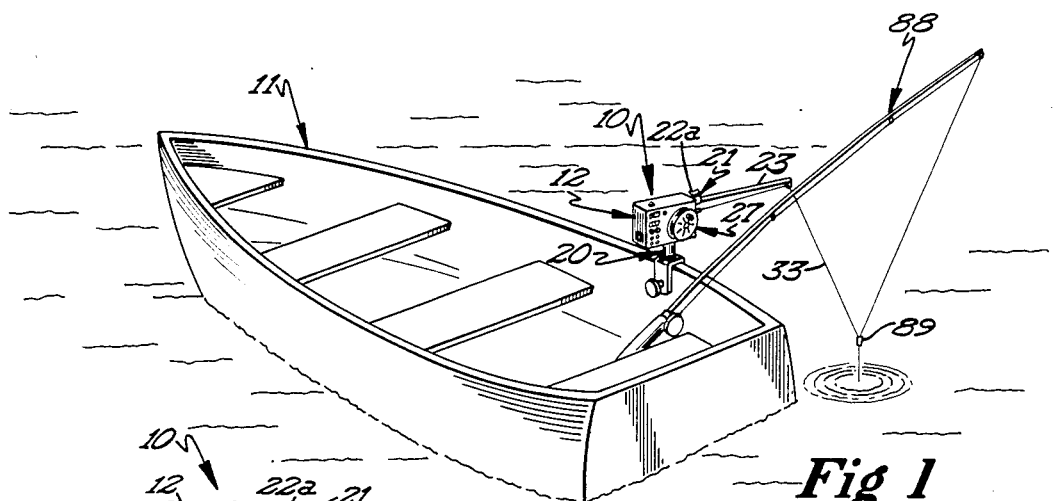
FIG. 1 is a view of the novel jigging device mounted on a boat, illustrating the manner of operation thereof.
Figure 2:
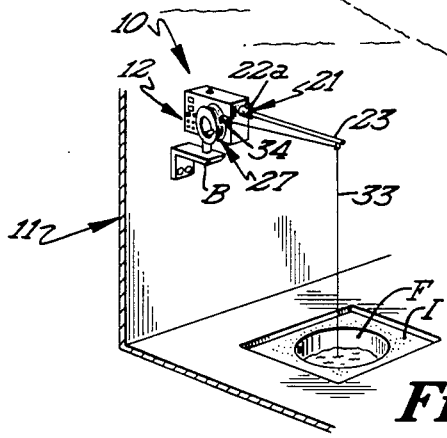
FIG. 2 is a perspective view of the jigging device used in ice fishing.
Figure 3:
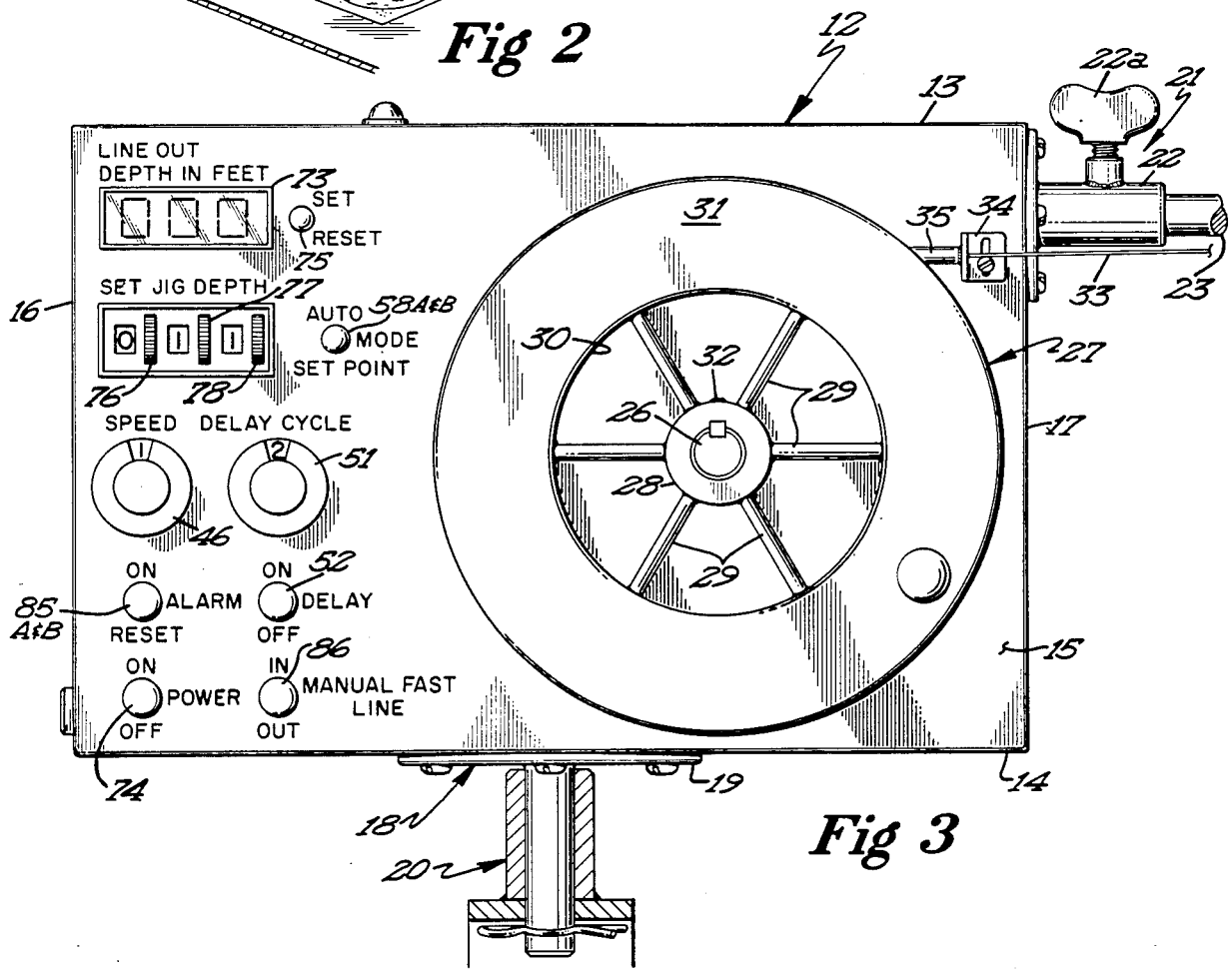
FIG. 3 is an enlarged perspective view of the jigging device.
Figure 4:
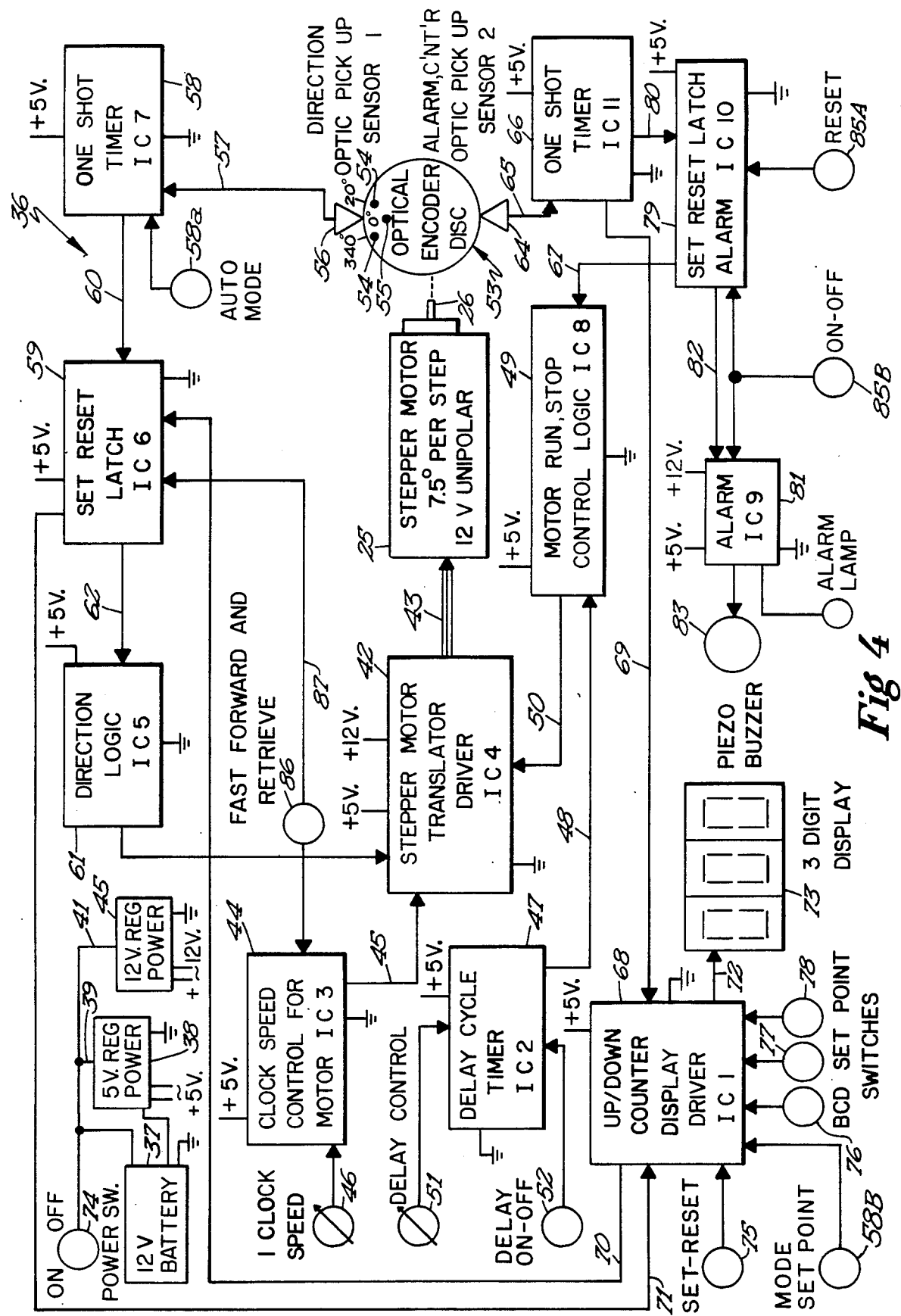
FIG. 4 is a circuit diagram of the electrical circuitry embodied in the jigging device.

Referring now to the drawings and, more specifically, to FIGS. 1, 2, and 3, it will be seen that one embodiment of the novel jigging device, designated generally by the reference numeral 10, is thereshown. In FIG. 1, the novel jigging device is illustrated in mounted relation on a boat. In FIG. 2, the device is illustrated in mounted relation in an ice fishing house for use in ice fishing.

When the jigging device is mounted on a boat, it may be mounted at any convenient location. The jigging device 10 includes a generally rectangular-shaped housing 12 having a top wall 13, a bottom wall 14, opposed substantially parallel side walls 15, a rear wall 16, and a front wall 17. A male swivel member 18 having a mounting bracket 19 integrally formed therewith is secured to the bottom wall 14 of the housing 12 by suitable bolts or the like. The male swivel member 18 is vertically disposed and is positioned within a female swivel member 20, which is secured to the boat at a selected location. With this arrangement, the housing 12 for the jigging device may freely swivel in a horizontal direction about a substantially vertical axis.

The front wall 17 of the housing 12 has a bracket 21 secured thereto by suitable bolts or the like. The bracket 21 is integrally formed therewith with a female socket member 22, which projects forwardly therefrom. The female socket member 22 is sized to receive the end portion of a 2-foot rod 23 therein, which is locked and secured against movement by a suitable set screw 22a. The outer end portion of the rod 23 may be provided with a suitable guide loop 24, which is arranged thereon in a well-known manner.

A 12-volt unipolar stepper motor 25 is mounted within the housing 12 and is provided with an outlet shaft 26, one end of which projects exteriorly of the housing 12. In the embodiment shown, the output shaft of the stepper motor will rotate through an arc of 7.5 degrees in response to each signal or pulse supplied thereto. It will, therefore, be appreciated that the stepper motor moves through 48 steps for one revolution of 360 degrees thereof. The step angle of the stepper motor may include a step angle other than 7.5 degrees. In order to achieve the preferred jigging action, the step angle may be within the range of 5 degrees to 20 degrees.

A spool or reel 27 is mounted on the output shaft 26 of the stepper motor 25 for rotation therewith. The spool 27 includes a hub 28 having spokes integrally formed therewith and extending radially outwardly therefrom. The outer ends of the spokes 29 are integral with a rim 30, which is provided with a pair of flanges 31. The hub 28 has a threaded recess therein for accommodating a set screw 32 which secures the hub and the spool to the output shaft 26. A fishing line 33 is wound upon the spool 27 and one end portion thereof extends outwardly therefrom. In the embodiment shown, the circumference of the rim 30 is approximately 12 inches so that, during one revolution of the spool, approximately one foot of line is paid out or is wound upon the spool. A handle is mounted on the spool so the line can be reeled in manually.

Referring again to FIG. 2, it will be seen that an L-shaped bracket 34 is secured to the side wall 15 of the housing through which the output shaft 26 projects. The L-shaped bracket has an opening therein through which projects a sleeve-like guide 35. It will be noted that the guide 35 is positioned closely adjacent the spool so that its longitudinal axis is disposed substantially tangential to the rim 30. The fishing line 33 is adapted to extend through the guide 35 and through the loop 24 of the rod 23 before the fishing line depends downwardly.

Referring now to FIG. 3, it will be seen that the electrical circuitry, designated generally by the reference numeral 36, for controlling and operating the different modes of operation of the stepper motor is thereshown. The source of electrical current for operating the jigging device comprises a conventional 12-volt battery 37 which is connected by a suitable electrical conductor 39 to a 5-volt regulated power supply unit 38. The power supply unit 38 is electrically connected to a number of the integrated circuit components while supplying power thereto. The battery 37 is also connected by a conductor 41 to a 12-volt regulated power supply unit 40, which supplies power to the electric stepper motor and to the alarm circuit. The stepper motor 25 is driven by a translator driver integrated circuit unit 42, which is electrically connected to the stepper motor by conductors 43. This stepper motor translator driver integrated circuit 42 is operable to not only control the direction of rotation of the stepper motor, but also controls other stepper features.

In this respect, a clock speed control integrated circuit 44 is electrically connected to the translator driver integrated circuit 42 by a conductor 45. The clock speed control integrated circuit 44 is provided with a potentiometer 46 which permits selection of the desired rotational speed of the stepper motor.

A delay cycle timer integrated circuit 47 is connected by an electrical conductor 48 to a motor run, stop control logic integrated or interrupter circuit. The control logic or interrupter circuit 49 is connected by an electrical conductor to the translator driver circuit 42 by a conductor 50. The delay cycle timer circuit 47 is adjustable to allow how often or how long the stepper motor 25 will operate. In this regard, the delay cycle timer circuit 47 is provided with a potentiometer 51 which permits selective adjustable setting of the delay cycle timer circuit by a user. The delay cycle timer circuit is also provided with an on-off switch 52, which allows the delay cycle timer circuit to be selectively de-energized, as desired.

The other end of the output shaft 26 of the stepper motor 25 has an encoder disc 53 secured thereto for rotation therewith. The encoder disc 53 has a pair of reflectors 54 arcuately arranged thereon and has a reflector 55 positioned radially inwardly from the reflectors 54. The arcuate spacing between the reflectors 54 is 40 degrees. A point located on the circumferential edge of the encoder disc halfway between the reflectors 54 is designated as 0. Therefore, one reflector is located at the 20-degree point of the disc and the other reflector is located at the 340-degree point of the disc. On the other hand, the reflector 55 is located halfway between the two reflectors 54 and is positioned at a 0 reading.

A directional optical pickup sensor 56 is positioned to receive signals transmitted by the reflectors 54. The signals or pulses are transmitted from the optical pickup sensor to a one-shot timer or pulse stretcher integrated circuit 58, which is electrically connected to the optical sensor 56 by an electrical conductor 57. In this regard, the one-time timer or pulse stretcher circuit 58 will only detect the first pulse and ignore the rest. This signal is transmitted to a set/reset latch integrated circuit 59. This pulse will cause the latch circuit 59 to be set or reset and is thereafter transferred to a directional logic integrated circuit 61 by means of a conductor 62. The signal or pulse is inverted by the direction logic circuit 61 and then transmitted to the translator driver circuit 42 for reversing operation of the stepper motor 25. The stepper motor 25 will run in this opposite direction through an arc of approximately 320 degrees until the optic pickup sensor 56 detects another pulse from one of the reflectors 54. This mode of operation is selected with an on-off switch 18A for the one-shot timer or stretcher circuit 58.

An alarm and counter optic pickup sensor 64 is also provided and is positioned to detect signals produced by the optic reflector 55 when the latter moves across the sensor 64. The signals detected by the optic sensor 64 will control the alarm circuit and/or the counter circuit during operation of the jigging device. In this regard, the optic sensor 64 is electrically connected to a one-shot timer or pulse stretcher integrated circuit 66 by an electrical conductor 65. The one-shot timer circuit 56 is electrically connected to the motor run, stop control logic circuit 49 by means of a conductor 67. The one-time timer circuit 66 is also connected to an up/down counter display driver integrated circuit 68 by means of an electrical conductor 69. The up/down counter display driver circuit 68 is connected by conductors 70 and 71 to the set/reset latch circuit 59. The up/down counter display driver circuit 68 is also connected to a 3-digit display component 73 by an electrical conductor 72. The display driver circuit 68 is provided with a set/reset switch 75. The counter display driver circuit 68 is also provided with set point switches 76, 77, and 78 for selectively setting the amount of vertical movement of the fishing line when operating in this mode.

In addition to controlling operation of the counter display driver circuit, the one-shot counter circuit 66 also controls operation of the alarm circuit. In this respect, the one-shot counter circuit 66 is connected to a set/reset latch integrated circuit 79 by means of a conductor 80. The set/reset latch circuit 79 is connected to an integrated alarm circuit 81 by means of a conductor 82. The alarm circuit 81 is provided with a piezo buzzer 83 of well-known construction and which produces an audible signal or alarm and alarm light.

The alarm circuit is provided with a reset switch 85A which is electrically connected to the set/reset latch circuit 79. An on-off switch 85B is electrically connected to the set/reset latch circuit 79 and the integrated alarm circuit 81.

A fast forward and retrieve switch 86 is electrically connected by a conductor 87 to the clock speed control circuit 44 and the set/reset latch circuit 59 by an electrical conductor 87. The function of this fast forward and retrieve switch 86 will be described more fully hereinbelow.

In use, the jigging device 10 will be mounted on a boat at a convenient location so that the housing 12 may freely swivel about a vertical axis defined by the male swivel member 18 and the female swivel member 20. The rod 23 will be mounted in the socket 22 of the bracket 21 and the fishing line will be unwound therefrom and passed through the loop 24.

A lure or bait may be attached to the fishing line 33 or, alternatively, the fishing line may be provided with a clip which may be clipped to the fishing line of conventional fishing gear. In this regard, reference is again made to FIG. 1, where a conventional fishing rod 88 is shown, which is provided with a lure or fishing bait. The end of fishing line 33 is secured by a releasable element to the line of the fish rod clip. Any conventional clip means, such as an alligator clip or the like, may be used, which may be readily detached from the fishing line of the fishing gear 88 by forcibly pulling on the line for the fishing gear.

Regardless of whether the rod 23 and fishing line 33 are used alone or in conjunction with conventional fishing gear, the operation of the electronic jigging device will be the same. The jigging device may be operated in two separate modes of operation. In one mode of operation, the bait or lure is jigged at substantially the same depth. To initiate this operation, switch 58A and switch 85B will both be shifted to the closed or on position. The potentiometer 46 will be set for controlling the speed of rotation of the stepper motor shaft and the delay switch 52 for the delay cycle timer circuit may be closed if a delay cycle between the steps is desired. Therefore, the delay control potentiometer 51 may be adjusted to a desired lapse time. Switch 58B for the counter display driver circuit 68 will be in the off position.

A pulse or signal will be transmitted via the translator driver circuit 42 to the stepper motor to energize the stepper motor for one step of operation. The shaft will rotate through an angle of 7½ degrees per step. The stepper motor will continue to operate in one direction until one of the reflectors 54 is moved into a signal transmitting position with respect to the optic sensor 56. When this occurs, a single pulse will be transmitted to the one shot timer circuit 58 and then to the set/reset latch circuit 59, where the latch circuit is set or reset for the next step. The signal is also transmitted to the direction logic circuit 61 where the signal is inverted and transmitted to the translator driver circuit 42 to rotate the stepper motor in the opposite direction.

The stepper motor will continue in this direction of operation until a reflector 54 again moves into position to transmit a signal to the optic pickup sensor 56 and the direction of rotation of the stepper motor will again be reversed. Since the encoder disc in this mode of operation can never go past 0 without reversing, no signal will be transmitted to the optic pickup sensor 64 by the reflector 55, even though switch 85 is in the on position.

However, in the event the fishing line 33 is pulled by a force to overcome the stepper motor torque, the encoder disc will be rotated through the 0 position and the reflector 55 will be moved into a signal transmitting position. The optic pickup sensor 64 will transmit the signal to the one shot timer circuit 66 and a signal is transmitted to the latch circuit 79 where the latch circuit is set or reset, and this signal is transmitted to the run-stop control logic circuit 49 to interrupt signals to the transistor driver circuit 42. The stepper motor is turned off and the spool is free-running and offers little resistance to the line. A signal will also be transmitted via the set/reset latch circuit 79 to the alarm circuit 81 for energizing the piezo buzzers and alarm light. An audible signal and a light signal is generated to apprise the fisherman that the spool and line are in a free-running condition.

During operation of the jigging device in this mode of operation, the fishing line will be given a rapid jerk during each step and the rate of movement will, of course, be determined by the setting of a potentiometer 46. The delay cycle timer circuit will determine the lapse between each step. Thus, the jigging action can be variously adjusted from a rapid jerking motion to a somewhat slower jerking motion. It will be appreciated that the stepper motor will operate through a few steps in one direction before the signal from the encoder disc reverses the operation in this mode. Thus, the action imparted to the bait or lure may be variously adjusted as desired by the fisherman.

In the other mode of operation, the stepper motor will operate to produce the jigging action on the line through a predetermined vertical distance and will then reverse to move the same distance in the opposite direction. With this arrangement, the bait will be jigged downwardly for a few or several feet and then will be jigged upwardly for the same distance.

In this mode of operation, the mode switch 58A will be shifted to the off position and the mode switch 58B for the up/down counter display driver circuit will be shifted to the on position. At the beginning of the cycle, the reset switch 75 will be actuated so that the three-digit display circuit 73 will indicate 0. It is pointed out that a given number can be set into the counter of the up/down counter display driver circuit 68 and this circuit will count to that number and then give an output pulse and thereafter count down to 0 and then give another output pulse. Initially, the fishing line 33 will either be manually pulled out or the fast forward and retrieve switch 86 will be shifted to unwind the line to a predetermined amount. For example, a fisherman may elect to jig the line from a lower depth of 25 feet to an upper depth of 7 feet. The vertical distance of 18 feet through which the jig will be moved will then be programmed into the counter display driver circuit 68. The switches 76, 77, and 78 will then be adjusted to indicate an 18-foot distance. The reset switch 75 will be momentarily closed so that the counter indicates 0 on the three-digit display and the circuitry is then energized.

The set/reset latch circuit 59 will give the direction of operation via the translator driver circuit 42 for indicating the particular direction of operation of the stepper motor in the retract direction. The stepper motor will step and jig upwardly through a series of steps until the 7-foot depth is reached. In this regard, the optic sensor 64 will sense a signal from the reflector 55 for every revolution of the encoder disc and every revolution of the spool 27. In the embodiment shown, each revolution of the spool constitutes one foot and these pulses will be counted by the counter display driver circuit 68 until the 7-foot depth is reached. The display on the three-digit display will indicate 18 and a signal will be transmitted from the counter display driver circuit to the set/reset latch circuit, the direction logic circuit 61, and the translator driver circuit 42 to operate the stepper motor in the opposite direction. The jigging action will continue in this opposite direction until the counter display drive circuits counts down to a 0 reading again, at which time a signal will be transmitted to reverse the operation of the stepper motor.

Referring now to FIG. 2, it will be seen that the novel jigging device 10 is mounted on the wall of fishing house H by means of a bracket B. The bracket B is of L-shaped configuration and has an opening therein for accommodating the female swivel member 20. The fishing line 33 extends downwardly through a hole F in the ice I. The holes made in the ice are of a typical size made by ice augers or the like.

In ice fishing, the fisherman typically jigs the fishing line and the novel jigging device is especially adapted for this purpose. Thus, it will be seen that the novel jigging device may be used either in a conventional fishing mode or in an ice fishing mode. In each instance, the jigging device produces movement that simulates the natural movement of minnows or other kinds of bait.

From the foregoing, it will be seen that the jigging device permits a fisherman to automatically jig at a given depth or, alternatively, allows the fisherman to jig in an up and downward direction through a predetermined distance. The jigging action itself can be variously adjusted as to the rapidity of the movement, as well as the delay between each increment of motion. This arrangement allows the fisherman to impart various kinds of action to the bait or lure over a wide range of adjustments.

The motion imparted to the bait or lure can be adjusted so that the bait simulates the movement of an injured minnow. Other types of motion can also be imparted to the bait or lure. Since the jigging device can be operated from a 12-volt battery as a power source, the device is ideal for most fishermen. It will further be seen that the device is a small, compact portable and can be transported in most conventional tackle boxes.

It will, therefore, be seen that we have provided a novel jigging device, which is not only of simple and inexpensive construction, but one which functions in a more efficient manner than any heretofore known comparable device.

What is claimed is:

1. A jigging machine for use in jigging a fishing line comprising:
   a housing,
   a reversible stepper motor in said housing having an output shaft, said stepper motor, when energized by a signal, rapidly rotating through a single step angle of predetermined magnitude,
   a reel mounted on said output shaft of said stepper motor and positioned exteriorly of the housing, an elongate flexible fishing line wound on said reel and having a lure or fishing bait at one end thereof,
   generally horizontally disposed guide means mounted on said housing exteriorly thereof and projecting therefrom, said fishing line engaging said guide means and depending therefrom,
   electrical circuitry connected to a source of electrical current and including a driver control circuit electrically connected with said stepper motor for controlling operation thereof,
   means producing a signal in response to rotation of said stepper motor output shaft through a predetermined angular movement thereof, and
   an inverter circuit electrically connected with said driver control circuit and said signal producing means for inverting the signal received from the latter to thereby reverse the operation of rotation of said stepper motor whereby said reel will be rotated in rapid steps and in opposite directions to impart a jigging action to the fishing line and the lure connected to the end thereof.

2. A jigging machine for use in jigging a fishing line comprising:
   a housing,
   a reversible stepper motor in said housing having an output shaft, said stepper motor, when energized by a signal, rapidly rotating through a single step angle within the range of 5 degrees to 20 degrees,
   a reel mounted on said output shaft of said stepper motor and positioned exteriorly of the housing, an elongate fishing line wound on said reel and having a lure or a fishing bait at one end thereof,
   a generally horizontally disposed guide means on said housing exteriorly thereof and projecting therefrom, said fishing line engaging said guide means and depending therefrom,
   electrical circuitry connected to a source of electrical current and including a driver control circuit electrically connected to said stepper motor for controlling operation thereof,
   sensor means sensing and producing a signal in response to each revolution of the output shaft of the stepper motor,
   programmable circuit means for selecting an upper depth and a lower depth through which the fishing line will be jigged, said programmable circuit means counting the signals produced by said sensor means and producing an output signal when the number of signals corresponding to the difference between the selected upper depth and lower depth is reached,
   inverter circuit means electrically connected to said programmable circuit means and to said driver control circuit for inverting the output signal received from the programmable circuit means to thereby reverse operation of the rotation of said stepper motor, whereby said reel will be rotated in rapid steps between said selected upper and lower depths to impart a jigging action to the fishing line and lure or bait connected to the end thereof.

3. The jigging machine as defined in claim 1 wherein said signal producing means produces a signal in response to rotation of the output shaft of the stepper motor through an arc of less than 360 degrees.

4. The jigging machine as defined in claim 1 wherein said output shaft of said stepper motor is moved through a step angle of less than 10 degrees.

5. The jigging machine as defined in claim 1 and means for mounting said housing on a boat or the like to permit swinging movement of the housing horizontally about a substantially vertical axis through an arc of 360 degrees.

6. The jigging machine as defined in claim 1 wherein said signal producing means produces a signal when the output shaft is rotated through a plurality of angle steps of the stepper motor output shaft in one direction, but less than 360 degrees.

7. The jigging machine as defined in claim 1 and circuit means electrically connected to said drive control circuit for variously adjusting the speed of rotation of the output shaft through a single step angle.

8. The jigging machine as defined in claim 1 and circuit means electrically connected to said driver circuit means for variously adjusting the timing between movement of said output shaft through consecutive step angles.

9. The jigging machine as defined in claim 1 and an alarm circuit electrically connected to said sensor means and including an audible and light alarm mechanism, said sensor means producing an output signal when a force of predetermined magnitude is exerted on the fishing line to forcibly rotate the output shaft against the torque of the stepper motor to thereby excite the alarm circuit and the audible alarm mechanism, an interrupter circuit electrically connected to said sensor means and to said drive control circuit and receiving the output signal from the sensor means to interrupt signals to said driver control circuit to thereby de-energize the stepper motor and allow the output shaft thereof to freewheel in response to the force exerted on the fishing line.

* * * * *